United States Patent
Essenmacher

(10) Patent No.: US 10,487,887 B2
(45) Date of Patent: Nov. 26, 2019

(54) ELECTROMECHANICAL APPARATUS FOR USE WITH A CONTROLLABLE COUPLING ASSEMBLY AND COUPLING AND ELECTROMECHANICAL CONTROL ASSEMBLY

(71) Applicant: Means Industries, Inc., Saginaw, MI (US)

(72) Inventor: Ryan W. Essenmacher, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 594 days.

(21) Appl. No.: 15/257,992

(22) Filed: Sep. 7, 2016

(65) Prior Publication Data

US 2016/0377126 A1    Dec. 29, 2016

Related U.S. Application Data

(63) Continuation-in-part of application No. 14/933,345, filed on Nov. 5, 2015, now Pat. No. 9,702,419.

(Continued)

(51) Int. Cl.
*F16D 28/00*    (2006.01)
*F16D 23/12*    (2006.01)
(Continued)

(52) U.S. Cl.
CPC ............. *F16D 28/00* (2013.01); *F16D 23/12* (2013.01); *F16D 41/125* (2013.01); *F16D 41/14* (2013.01); *F16D 2023/123* (2013.01)

(58) Field of Classification Search
CPC ........ F16D 41/125; F16D 41/14; F16D 23/12; F16D 2023/123; F16D 28/00
(Continued)

(56) References Cited

U.S. PATENT DOCUMENTS 2,947,537 A    8/1960   Littell et al.
2,959,062 A    11/1960  Looker et al.
(Continued)

FOREIGN PATENT DOCUMENTS

CN    2290546 Y    9/1998
CN    202326937 U   7/2012

OTHER PUBLICATIONS

United States Patent and Trademark Office, Non-Final Office Action for U.S. Appl. No. 15/251,346 dated Jul. 18, 2018.
(Continued)

*Primary Examiner* — Richard M Lorence
(74) *Attorney, Agent, or Firm* — Brooks Kushman P.C.

(57) ABSTRACT

An electromechanical apparatus for use with a controllable coupling assembly and a coupling and electromechanical control assembly are provided. The apparatus includes a locking member pivotable between an uncoupling position and a coupling position characterized by abutting engagement with a load-bearing shoulder of the coupling assembly. Also included is a bi-directional, electrically-powered, actuator and transmission assembly including a rotary output shaft and a set of interconnected transmission elements including an input transmission element coupled to the output shaft to rotate therewith. An output transmission element translates upon rotation of the output shaft to actuate the locking member and cause the locking member to pivot between the coupling and uncoupling positions which correspond to different operating modes of the coupling assembly.

46 Claims, 8 Drawing Sheets

Related U.S. Application Data

(60) Provisional application No. 62/259,734, filed on Nov. 25, 2015, provisional application No. 62/076,646, filed on Nov. 7, 2014.

(51) Int. Cl.
*F16D 41/12* (2006.01)
*F16D 41/14* (2006.01)

(58) Field of Classification Search
USPC .................................................. 192/69.1
See application file for complete search history.

(56) References Cited

U.S. PATENT DOCUMENTS

| | | | |
|---|---|---|---|
| 4,050,560 A | 9/1977 | Torstenfelt | |
| 4,340,133 A | 7/1982 | Blersch | |
| 4,651,847 A | 3/1987 | Hermanns | |
| 5,043,892 A | 8/1991 | Brekkestran et al. | |
| 5,461,935 A | 10/1995 | Hill | |
| 5,927,455 A | 7/1999 | Baker et al. | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,307,376 B1 | 10/2001 | Alexander et al. | |
| 6,568,517 B2 | 5/2003 | Le-Calve et al. | |
| 6,607,292 B2 | 8/2003 | Gutierrez et al. | |
| 6,679,362 B2 | 1/2004 | Berger et al. | |
| 6,905,009 B2 | 6/2005 | Reed et al. | |
| 7,044,263 B2 | 5/2006 | Fischbach et al. | |
| 7,198,587 B2 | 4/2007 | Samie et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,699,746 B2 | 4/2010 | Maguire | |
| 7,743,678 B2 | 6/2010 | Wittkopp et al. | |
| 7,766,790 B2 | 8/2010 | Stevenson et al. | |
| 7,942,781 B2 | 5/2011 | Kimes | |
| 7,992,695 B2 | 8/2011 | Wittkopp et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 8,272,488 B2 | 9/2012 | Eisengruber et al. | |
| 8,276,725 B2 | 10/2012 | Swales et al. | |
| 8,286,772 B2 | 10/2012 | Eisengruber | |
| 8,324,890 B2 | 12/2012 | Lin | |
| 8,540,065 B2 | 9/2013 | Samie et al. | |
| 8,602,187 B2 | 12/2013 | Prout | |
| 8,646,587 B2 | 2/2014 | Kimes | |
| 8,794,411 B2 | 8/2014 | Lee et al. | |
| 8,888,637 B2 | 11/2014 | Kimes | |
| 8,991,582 B2 | 3/2015 | Eguchi et al. | |
| 9,121,454 B2 | 9/2015 | Pawley | |
| 9,127,724 B2 | 9/2015 | Kimes et al. | |
| 9,377,061 B2 | 6/2016 | Kimes et al. | |
| 9,765,830 B2 | 9/2017 | Shioiri et al. | |
| 9,822,825 B2 | 11/2017 | Essenmacher | |
| 10,018,232 B2 | 7/2018 | Itagaki et al. | |
| 2004/0238306 A1 | 12/2004 | Reed et al. | |
| 2005/0189190 A1 | 9/2005 | Kowalsky et al. | |
| 2006/0185957 A1 | 8/2006 | Kimes et al. | |
| 2007/0034470 A1 | 2/2007 | Fetting et al. | |
| 2007/0278061 A1 | 12/2007 | Wittkopp et al. | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0005212 A1 | 1/2009 | Maguire et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0022342 A1 | 1/2010 | Samie et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2010/0255954 A1 | 10/2010 | Samie et al. | |
| 2011/0068775 A1 | 3/2011 | Lin | |
| 2011/0177900 A1 | 7/2011 | Simon | |
| 2011/0183806 A1 | 7/2011 | Wittkopp et al. | |
| 2011/0192697 A1 | 8/2011 | Prout et al. | |
| 2012/0090952 A1 | 4/2012 | Lee et al. | |
| 2012/0145506 A1 | 6/2012 | Samie et al. | |
| 2012/0152683 A1 | 6/2012 | Kimes | |
| 2012/0152687 A1 | 6/2012 | Kimes et al. | |
| 2012/0231913 A1 | 9/2012 | Samie et al. | |
| 2013/0199885 A1 | 8/2013 | Quehenberger et al. | |
| 2013/0256078 A1 | 10/2013 | Kimes et al. | |
| 2014/0190785 A1 | 7/2014 | Fetting et al. | |
| 2014/0305761 A1 | 10/2014 | Kimes | |
| 2014/0353109 A1 | 12/2014 | Eguchi et al. | |
| 2015/0001023 A1 | 1/2015 | Kimes et al. | |
| 2015/0204391 A1 | 7/2015 | Kimes | |
| 2016/0129864 A1 | 5/2016 | Essenmacher | |
| 2016/0273595 A1 | 9/2016 | Shioiri et al. | |
| 2016/0298704 A1 | 10/2016 | Itagaki et al. | |
| 2016/0377126 A1 | 12/2016 | Essenmacher | |
| 2017/0037914 A1 | 2/2017 | Hibino et al. | |

OTHER PUBLICATIONS

State Intellectual Property Office of People's Republic of China, First Office Action for the corresponding Chinese patent application No. 2016800692300, dated Apr. 26, 2019.

Notice of Allowance, dated May 19, 2017, U.S. Appl. No. 14/933,345.

The International Bureau of WIPO, International Preliminary Report on Patentability for International Aoplication No. PCT/US2016/062459 dated Jun. 7, 2018.

The International Bureau of WIPO, International Preliminary Report on Patentability for International Application No. PCT/US2016/062404 dated Jun. 7, 2018.

International Search Report and Written Opinion, International appln No. PCT/US2016/061488, dated Jan. 19, 2017.

International Search Report and Written Opinion, International appln No. PCT/US2016/062459, dated Jan. 31, 2017.

ELECTROMECHANICAL APPARATUS FOR USE WITH A CONTROLLABLE COUPLING ASSEMBLY AND COUPLING AND ELECTROMECHANICAL CONTROL ASSEMBLY

CROSS-REFERENCE TO RELATED APPLICATIONS

This application is a continuation-in-part of U.S. application Ser. No. 14/933,345 filed Nov. 5, 2015, which, in turn, claims the benefit of U.S. provisional application Ser. No. 62/076,646 filed Nov. 7, 2014. This application also claims benefit of U.S. provisional application serial No. 62/259,734, filed Nov. 25, 2015.

TECHNICAL FIELD

At least one embodiment of the invention generally relates to an electromechanical apparatus device for use with a controllable coupling assembly and, in particular, coupling and electromechanical control assemblies which utilize such apparatus.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesirable to have a relatively large distance between the locking member and the actuator which moves the locking member. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2009/0194381; 2008/0223681; 2008/0169165; 2008/0169166; 2008/0185253; and the following U.S. Pat. Nos. 8,079,453; 7,992,695; 8,051,959; 7,766,790; 7,743,678; and 7,491,151.

U.S. Pat. No. 9,127,724 discloses a radial, solenoid-operated strut for controlling a coupling assembly.

U.S. Pat. No. 9,121,454 discloses in its FIG. 9 (labeled as FIG. 1 in this application), an asymmetrical teeter-totter or seesaw-shaped, locking member or strut, generally indicated at 22, constructed or made in accordance with at least one embodiment of the present invention. The locking member 22 controllably transmits torque between first and second clutch or coupling members, generally indicated at 24 and 26, respectively, of a coupling assembly, generally indicated at 28.

The first coupling member 24 may be a pocket plate which can rotate in either a clockwise direction or a counter-clockwise direction about the rotational axis of the assembly 28 and includes a generally flat, annular coupling face having a plurality of pockets, generally indicated at 32, each one of which is sized and shaped to receive and nominally retain a locking member such as the locking member 22. The pockets 32 are spaced about the axis of the assembly 28. The face is oriented to face axially in a first direction along the rotational axis of the assembly 28.

The second clutch member 26 may be a notch plate and has a generally flat, annular coupling second face 33 opposed to the first face and oriented to face axially in a second direction opposite the first direction along the rotational axis of the assembly 28. The second face 33 has a plurality of locking formations 35 that are engaged by the locking members 22 upon projection from the pockets 32 to prevent relative rotation of the first and second members 24 and 26 with respect to each other in at least one direction about the axis of the assembly 28.

The locking member 22 includes a member-engaging first end surface 34, a member-engaging second end surface 36, and an elongated main body portion 38 between the end surfaces 34 and 36. The locking member 22 may also include projecting pivots 40 which extend laterally from the main body portion 38 for enabling pivotal motion of the locking member 22 about a pivot axis of the locking member 22 which intersects the pivots 40. The end surfaces 34 and 36 of the locking member 22 are movable between engaged and disengaged positions with respect to the coupling members 24 and 26 during the pivotal motion whereby one-way torque transfer may occur between the coupling members 24 and 26 in the engaged positions of the locking members 22.

In general, the pivots 40 are sized, shaped and located with respect to the main body portion 38 to allow frictional engagement of an end surface of the pivot with an outer wall of the pocket 32 to occur near the pivot axis during rotation of the first coupling member 24 and the retained locking member 22 above a predetermined RPM, thereby significantly reducing overall movement on the locking member 22 about the pivot axis that has to be overcome to move the locking member 22 between its engaged and disengaged positions.

The assembly 28 also includes an aperture retainer element or plate 47 supported between the first and second clutch members 24 and 26, respectively. The retainer element 47 has at least one opening extending completely therethrough to allow the locking members or struts 22 to extend therethrough and lock the first and second clutch members 24 and 26, respectively, together. The upper surfaces of the pivots 40 pivot against the lower surface of the retainer plate 47 during such movement.

The inner pivot 40 is notched to allow frictional engagement of a side surface of the notched inner pivot 40 with an inner wall of the pocket 32 and to prevent rotation of the locking member 22 in the pocket 32. The outer pivot may also be notched in like fashion so that the locking member 22 can be used as either a forward locking member or a reverse locking member.

The pocket 32 provides sufficient clearance to allow sliding movement of the locking member 22 during movement of the locking member 22 between the engaged and disengaged positions.

The locking member 22 may be an injection molded locking member such as a metal injection molded locking member or part.

The first coupling member 24 also has a face (not shown but opposite the first face having a plurality of passages 56 spaced about the rotational axis of the assembly 28 and including a passage 56 in communication with the pocket 32. The passages 56 communicate actuating forces to their respective locking members 22 within their respective pockets 32. The first face and the opposite face are generally annular and extend generally radially with respect to the rotational axis of the assembly 28.

Actuators, such as spring actuators including a spring actuator 58, may be received within the passage 56 to provide the actuating forces to actuate the locking members 22 within their respective pockets 32 so that the locking members 22 move between their engaged and disengaged positions. Other types of actuators beside the spring actuators 58 may be used to provide the actuating forces.

Biasing members such as coiled return springs including a coiled return spring 60 bias the locking members 22 against pivotal motion of the locking members 22 towards their engaged positions. The spring actuators 58 pivot their locking members 22 against the bias of the spring biasing members 60. Each pocket 32 has an inner recess 62 for receiving its respective biasing spring 60 wherein the pocket 32 is a spring pocket.

Other U.S. patent publications which disclose controllable or selectable one-way clutches include U.S. Pat. Nos. 6,193,038; 7,198,587; 7,275,628; 8,602,187; and 7,464,801, and U.S. Publication Application Nos. 2007/0278061; 2008/0110715; 2009/0159391; 2009/0211863; 2010/0230226; 2014/0305761; 2014/0190785 and 2015/0204391.

Despite the above, a need exists to provide non-hydraulic clutch disengagement under load, especially during extremely low startup temperatures (i.e. −40° or lower) while conserving space in an automatic transmission environment.

Other U.S. patent documents related to the present application include: U.S. Pat. No. 2,947,537; 2,959,062; 4,050,560; 4,340,133; 4,651,847; 6,607,292; 6,905,009; 7,942,781; 8,061,496; 8,286,772; 8,646,587; 8,888,637; 2004/0238306; 2006/0185957; 2007/0034470; 2009/0255773; 2010/0022342; 2010/0255954; 2011/0177900; 2012/0090952; 2012/0152683; and 2012/0152687.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magneto transistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch-position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive.

U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-sensor gap tolerances, a ratio of the voltage of one Hall sensor to the sum of the voltages from both Hall sensors is used to correlate to the piston and, hence, clutch position.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Metal injection molding (MIM) is a metalworking process where finely-powdered metal is mixed with a measured amount of binder material to comprise a "feedstock" capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Currently equipment capability requires processing to stay limited to products that can be molded using typical volumes of 100 grams or less per "shot" into the mold. Rheology does allow this "shot" to be distributed into multiple cavities, thus becoming cost-effective for small, intricate, cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal allow.

SUMMARY OF EXAMPLE EMBODIMENTS

An object of at least one embodiment of the present invention is to provide an electromechanical apparatus for use with a controllable coupling assembly and a coupling and electromechanical control assembly wherein rotary motion of an output shaft is converted to translational movement to directly actuate a locking member of the coupling assembly.

In carrying out the above object and other objects of at least one embodiment of the present invention an electromechanical apparatus for use with a controllable coupling assembly is provided. The apparatus includes a locking member pivotable between an uncoupling position and a coupling position characterized by abutting engagement with a load-bearing shoulder of the coupling assembly. The apparatus further includes a bi-directional, electrically-powered, actuator and transmission assembly including a rotary output shaft and a set of interconnected transmission elements including an input transmission element coupled to the output shaft to rotate therewith and an output transmission element which translates upon rotation of the output shaft to actuate the locking member and cause the locking member to pivot between the coupling and uncoupling positions which correspond to different operating modes of the coupling assembly.

The set of transmission elements may include a threaded screw shaft and a nut threaded onto the screw shaft.

The locking member may be a strut.

The input transmission element may comprise the screw shaft wherein rotation of the screw shaft causes the nut to translate.

The input transmission element may be coupled to the nut to rotate the nut and cause the screw shaft to translate and wherein a free end of the screw shaft actuates the locking member.

The input transmission element may include a first cam and the set of transmission elements may include a second cam coupled to the nut to rotate therewith and ride on the first cam so that the nut rotates upon rotation of the output shaft.

The actuator and transmission assembly may include a DC motor having the output shaft.

The apparatus may further include at least one non-contact position sensor to provide a position feedback signal as a function of the position of one of the transmission elements or the locking member.

Each sensor may include at least one magnetic or ferromagnetic magnet and at least one magnetic field sensing element disposed adjacent and stationary with respect to the at least one magnet for sensing magnetic flux to produce the position feedback signal.

Each magnetic field sensing element may be a Hall effect sensor.

The output transmission element may comprise a plunger coupled to the nut to translate therewith.

The actuator and transmission assembly may further include a biasing member to urge the plunger to a retracted position which corresponds to the uncoupling position of the locking member.

The actuator and transmission assembly may further include a biasing member to urge the plunger to an extended position which corresponds to the coupling position of the locking member.

The nut may be non-back-drivable on the screw shaft.

The apparatus may further include a latching mechanism to hold one of the set of transmission elements in position. The latching mechanism may include a latching solenoid.

The strut may be a clevis strut wherein the output transmission element has a free end pivotally connected to the clevis strut.

The strut may have a socket wherein the output transmission element has a ball formed at a free end thereof for insertion into the socket to form a ball-and-socket joint.

The apparatus may have a plurality of locking members and a corresponding plurality of output transmission elements. The set of transmission elements may include a common, intermediate transmission element coupled to the nut to translate therewith and coupled to the output transmission elements so that the output transmission elements move in unison to actuate the plurality of locking members.

The intermediate transmission element may comprise a plate on which the plurality of output transmission elements are supported.

The strut maybe a teeter-totter or seesaw-shaped strut.

The input transmission element may comprise a cam and the output transmission element may comprise a plunger having one end which rides on the cam to cause the plunger to translate upon rotation of the output shaft.

Further in carrying out the above object and other objects of at least one embodiment of the present invention, a coupling and electromechanical control assembly is provided. The assembly includes a coupling subassembly including first and second coupling members. The first coupling member is supported for rotation relative to the second coupling member about an axis. The first coupling member has a first coupling face with a plurality of recesses. Each of the recesses defines a load-bearing shoulder. The assembly also includes a locking member pivotable between an uncoupling position and a coupling position characterized by abutting engagement with a load-bearing shoulder of the first coupling member. The assembly further includes a bi-directional, electrically-powered, actuator and transmission subassembly which includes a rotary output shaft and a set of interconnected transmission elements including an input transmission element coupled to the output shaft to rotate therewith and an output transmission element which translates upon rotation of the output shaft to actuate the locking member and cause the locking member to pivot between the coupling and uncoupling positions which correspond to different operating modes of the coupling assembly.

The set of transmission elements may include a threaded screw shaft and a nut threaded onto the screw shaft.

The locking member may be a strut.

The input transmission element may comprise the screw shaft wherein rotation of the screw shaft causes the nut to translate.

The input transmission element may be coupled to the nut to rotate the nut and cause the screw shaft to translate wherein a free end of the screw shaft actuates the locking member.

The input transmission element may include a first cam and the set of transmission elements includes a second cam coupled to the nut to rotate therewith and ride on the first cam so that the nut rotates upon rotation of the output shaft.

The actuator and transmission subassembly may include a DC motor having the output shaft.

The assembly may further include at least one non-contact position sensor to provide a position feedback signal as a function of the position of one of the transmission elements or the locking member.

Each sensor may include at least one magnetic or ferromagnetic magnet and at least one magnetic field sensing element disposed adjacent and stationary with respect to the at least one magnet for sensing magnetic flux to produce the position feedback signal.

Each magnetic field sensing element may be a Hall effect sensor.

The output transmission element may comprise a plunger coupled to the nut to translate therewith.

The actuator and transmission subassembly may further include a biasing member to urge the plunger to a retracted position which corresponds to the uncoupling position of the locking member.

The actuator and transmission subassembly may further include a biasing member to urge the plunger to an extended position which corresponds to the coupling position of the locking member.

The nut may be non-back-drivable on the screw shaft.

The assembly may include a latching mechanism to hold one of the set of transmission elements in position. The latching mechanism may include a latching solenoid.

The strut may be a clevis strut wherein the output transmission element has a free end pivotally connected to the clevis strut.

The strut may have a socket wherein the output transmission element has a ball formed at a free end thereof for insertion into the socket to form a ball-and-socket joint.

The assembly may have a plurality of locking members and a corresponding plurality of output transmission elements. The set of transmission elements may include a common, intermediate transmission element coupled to the nut to translate therewith and coupled to the output transmission elements so that the output transmission elements move in unison to actuate the plurality of locking members.

The intermediate transmission element may comprise a plate on which the plurality of output transmission elements are supported.

The strut may be a teeter-totter strut.

The input transmission element may comprise a cam and the output transmission element may comprise a plunger having one end which rides on the cam to cause the plunger to translate upon rotation of the output shaft.

The first coupling face may be oriented to face axially with respect to the axis.

The first coupling face may be oriented to face radially with respect to the axis.

While exemplary embodiments are described above, it is not intended that these embodiments describe all possible forms of the invention. Rather, the words used in the specification are words of description rather than limitation, and it is understood that various changes may be made without departing from the spirit and scope of the invention.

BRIEF DESCRIPTION OF THE DRAWINGS

FIG. 7 shows the two directly coupled via a gear on the motor's shaft and splines on the outer diameter of the rotating nut;

DETAILED DESCRIPTION

Figure 1:
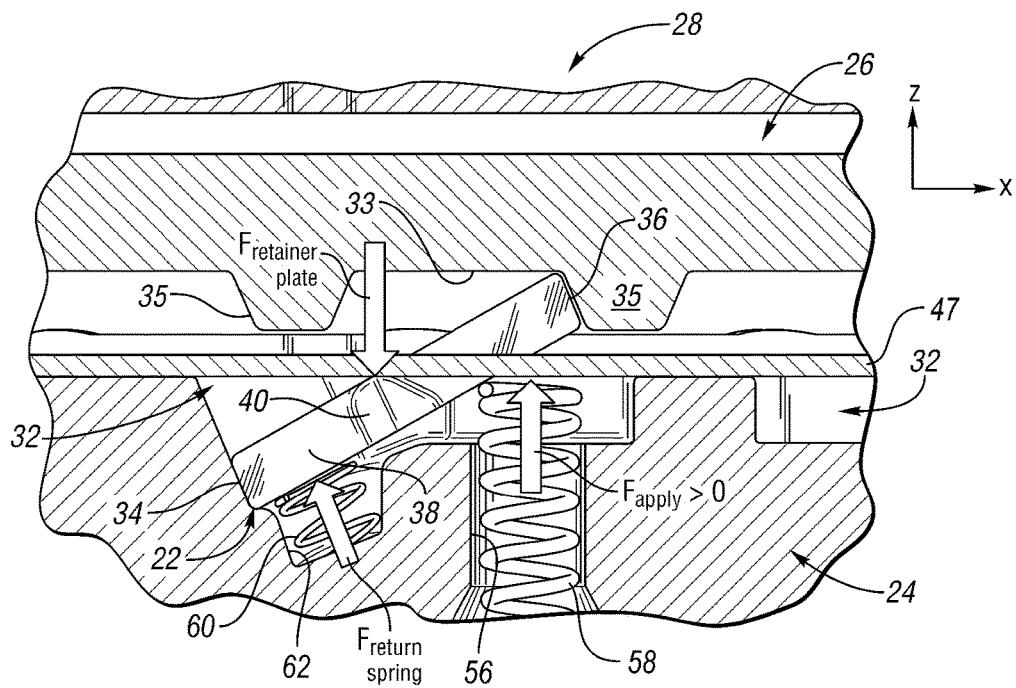
FIG. 1 is a view, partially broken away and in cross section, of a seesaw or teeter-totter-shaped locking member or strut which has been rotated or pivoted about a pivot axis to an engagement or coupling position by a spring actuator.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a plurality of disclosed embodiments, parts of an electromechanical apparatus for use with a selectable or controllable clutch or coupling assembly to control the operating mode or state of the assembly is generally indicated at 80, 180, 280, 380, 480, 580, 680, 780, 880 and 980 in FIGS. 2, 3, 4, 5, 6, 7, 8, 9, 10 and 11 respectively, wherein parts of an embodiment other than the first embodiment which perform the same or similar function as the parts of the first embodiment have the same last two digits but a different first digit. For example, each actuator or DC electric motor of each of the embodiments has "82" as its last two digits of its reference number. Hence, the DC electric motors of the different embodiment are 82, 182, 282, 382, 482, 582, 682, 782, 882 and 982 respectively, in FIGS. 2, 3, 4, 5, 6, 7, 8, 9, 10 and 11.

In general, one or more embodiments of the invention:
Combine a clevis strut arrangement with a lead screw;
Provide linear motion of the lead screw which results in the pivoting motion of the strut;
Provide tolerances around the interface between the clevis and the plunger semi-rigidly to attach the strut to a nut; this provides the ability to disengage the strut under load; this also prevents the actuator assembly from seeing loading due to the strut engaging and carrying torque;
Add two springs to a plunger which can spring isolate the plunger from the nut, allowing the system to be biased when strut motion would otherwise be blocked;
Avoids the screw and its motor pushing or pulling a blocked nut/plunger;
Improves system response time as the nut can be moved to a desired state while strut motion remains blocked; once unloaded, the system will drop into the desired state;
Can be used in either a radial or a planar clutch design;
Allows several struts to be ganged or actuated together;
Can utilize sensors to determine the position of the nut and therefore struts on semi-rigid designs; sensors can determine the position of the plunger on the mechanically decoupled units.

Parts of the assembly 80 of the first embodiment (i.e., FIG. 2) include a bi-directional, electrically-powered, actuator and transmission subassembly or assembly, generally indicated at 84, coupled to one or more locking members or struts 86 for selective, pivotal, locking member movement between coupling and uncoupling positions (uncoupling shown in FIG. 2) which correspond to first and second operating modes of the clutch assembly, respectively.

Figure 2:
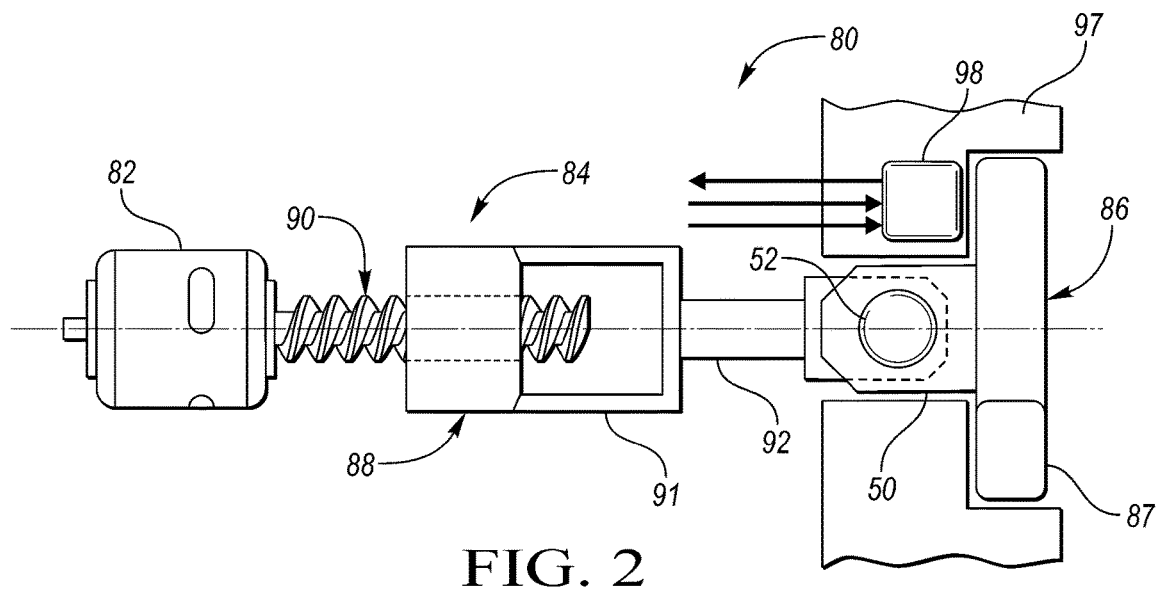
FIG. 2 is a schematic view, partially broken away, of an electromechanical apparatus constructed in accordance with at least one embodiment of the present invention together with a sensing arrangement and a stationary pocket plate of a coupling assembly which may be either static or dynamic; if dynamic, the motor and screw would rotate into/out of the page with the pocket and strut.

The assembly 84 holds the locking member 86 in a desired commanded position after electrical power to the assembly 84 has been purposefully terminated. In the embodiment of FIG. 2, a latch mechanism of the assembly 84 may include a self-locking, non-back-drivable nut, generally indicated at 88, threadedly mounted for linear movement on a threaded lead screw or screw shaft, generally indicated at 90 which, in turn, is coupled to the output shaft of the bi-directional D.C. motor or brushed DC motor 82. The nut 88 preferably includes a u-shaped coupler or cage 91 for coupling the nut 88 to a plunger 92 while allowing the screw shaft 90 to extend through the nut 88 and spacing the screw shaft 90 from the plunger 92. The nut 88 should be allowed to make full travel in either direction. It would be preferable to avoid the cage arrangement drawn in FIG. 2 and simply leave the area 91 solid. The only requirement is that the strut 86 should bottom out in the pocket 97 before the screw 90 bottoms out in the nut 88.

The screw shaft 90 provides high torque multiplication while still packaging in available envelopes. The assembly 84 can package as a retrofit into existing space for other actuator designs. The increased mechanical advantage of the lead screw 90 presents several advantages over other actuation methods:

i. Specifically, by selecting a steep (small) enough lead angle of the screw 90, the nut 88 can be made "non-back-drivable". "Non-back-drivable" is defined as the nut 88 not being able to be moved due to external forces on the nut 88. The nut 88 will only move linearly due to rotation of the screw shaft 90. This allows for a latching actuator design.

ii. The increased torque multiplication of the screw shaft 90 can allow for the DC brushed drive motor 82 to be decreased in size and cost. It is very difficult for DC brushed motors to simultaneously satisfy high output speed, high output torque and low power consumption. In order to meet the OEM's requirements for low actuation time (motor output speed) and power consumption, the required motor output torque needs to be sacrificed or decreased. The screw shaft 90 provides a higher ratio of torque multiplication than other simple gear reductions, reducing the motor's required output torque. With a smaller torque requirement, a smaller DC motor can be selected. Smaller motors typically provide higher output speeds and lower power consumption as desired by the OEM's.

In the first embodiment of FIG. 2, the assembly 84 includes an output member in the form of the plunger 92 which translates together with its coupled nut 88 along its lead screw 90 upon rotation of the output shaft of the motor 82.

Figure 7:
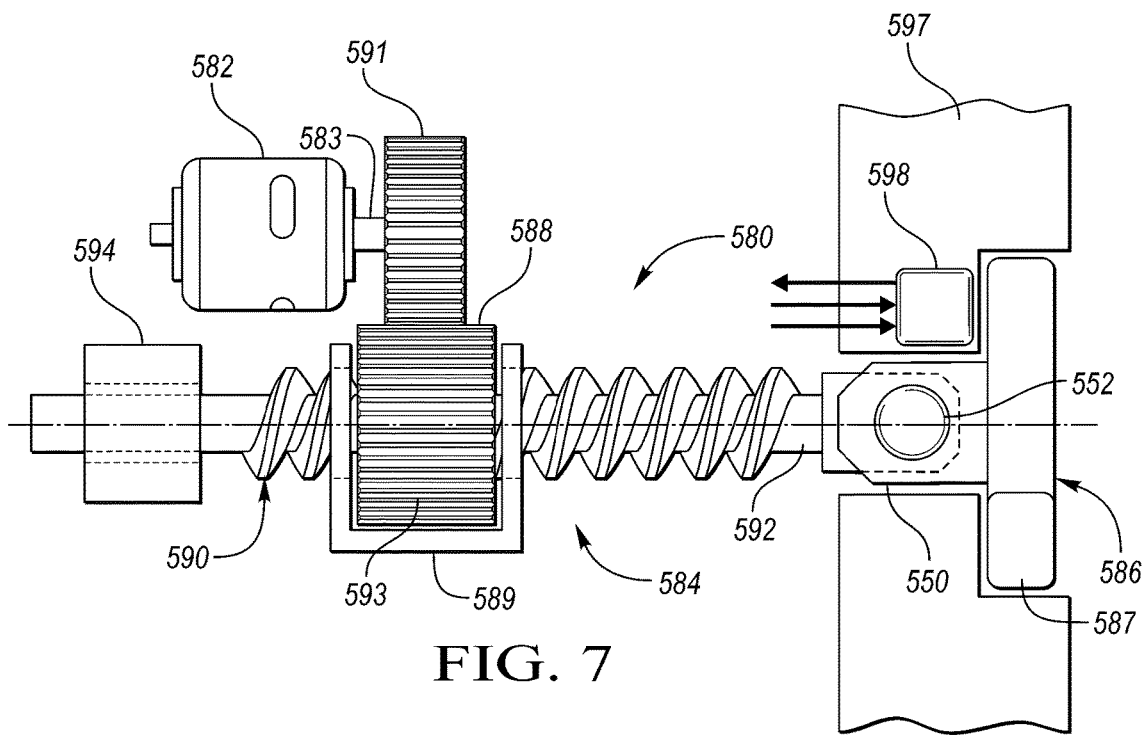
FIG. 7 is a view, similar to the view of FIG. 2, wherein the nut does not translate but rather rotates as the motor rotates to actuate a strut contained within a static pocket plate.
Figure 8:
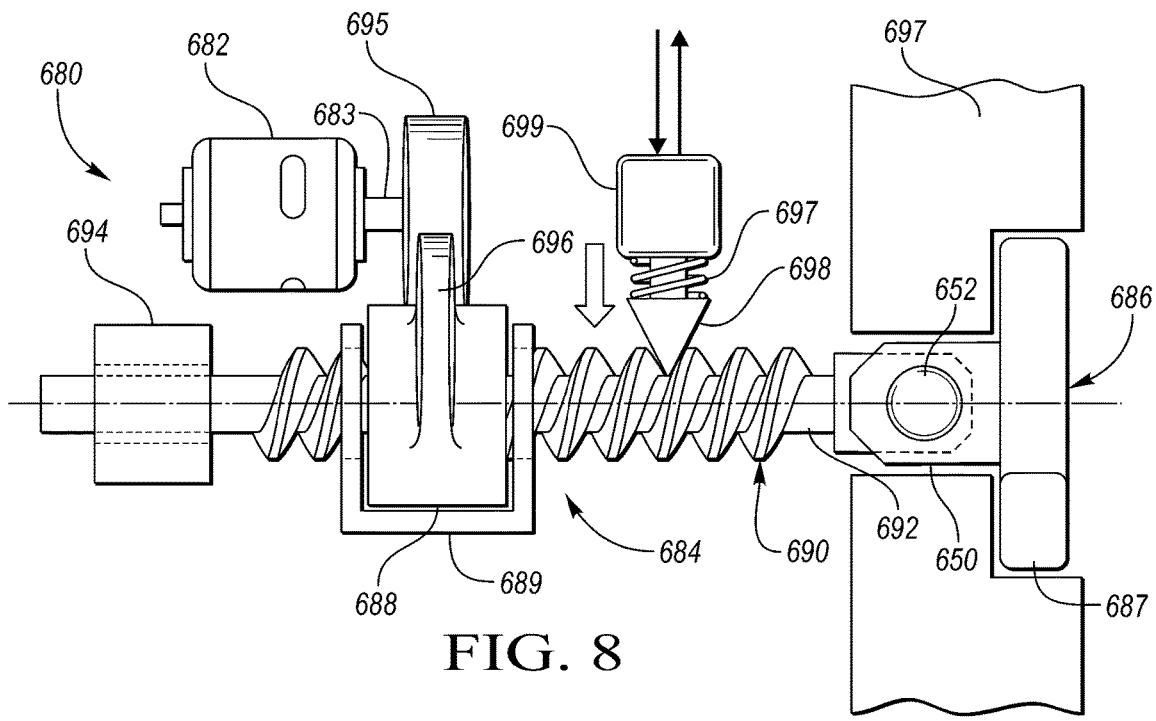
FIG. 8 is a view, similar to the view of FIG. 7, wherein a latching mechanism in the form of a solenoid traps and prevents linear motion of a lead screw caused by a rotating nut; an alternate method to couple the motor to a rotating nut is also shown.

By contrast, the screw shafts 590 and 690 of FIGS. 7 and 8, respectively, are supported for linear motion by bushings 594 and 694, respectively. In these embodiments, the nuts 588 and 688, respectively, rotate to cause their respective lead screws 590 and 690 and their respective coupled plungers 592 and 692 to translate.

The assembly 684 of FIG. 8 also includes a cam 695 mounted for rotation on the output shaft 683 of the actuator or motor 682. The cam 695 has an outer cam surface which rides on an outer cam surface 696 integrally formed on the nut 688. The nut 688 is supported for rotation by a u-shaped support 689. The nut 688 is threaded onto the screw shaft 690 which translates the plunger 692 (which is integral with the shaft 690) upon rotary movement of the output shaft 683 of the motor 682.

In the embodiment of FIG. 7, a gear 591 is coupled to the output shaft 583 of the motor 582 to rotate therewith. The nut 588 has teeth 593 formed on its outer surface which mesh with the gear 591 to rotate the nut 588 causing the screw shaft 590 and its respective plunger 592 (which is also integral with its shaft 590) to translate. The nut 588 is supported for rotation by a u-shaped support 589.

Figure 11:
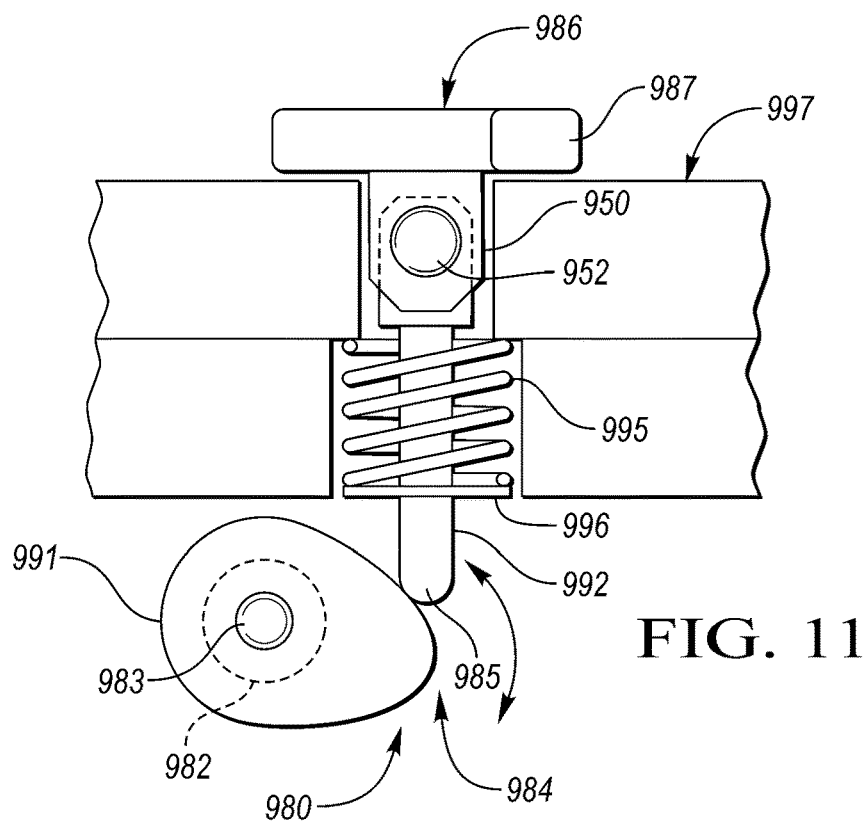
FIG. 11 is a schematic end view, partially broken away, of a motor-driven cam acting directly on a strut plunger.

In the embodiment of FIG. 11, a cam 991 is coupled to the output shaft 983 of its motor 982 to rotate therewith. A ball-shaped portion or curved surface 985 is formed on a free end of the plunger 992 to ride on the outer surface of the cam 991 thereby converting rotary motion of the cam 991 to translational movement of the plunger 992.

Figure 5:
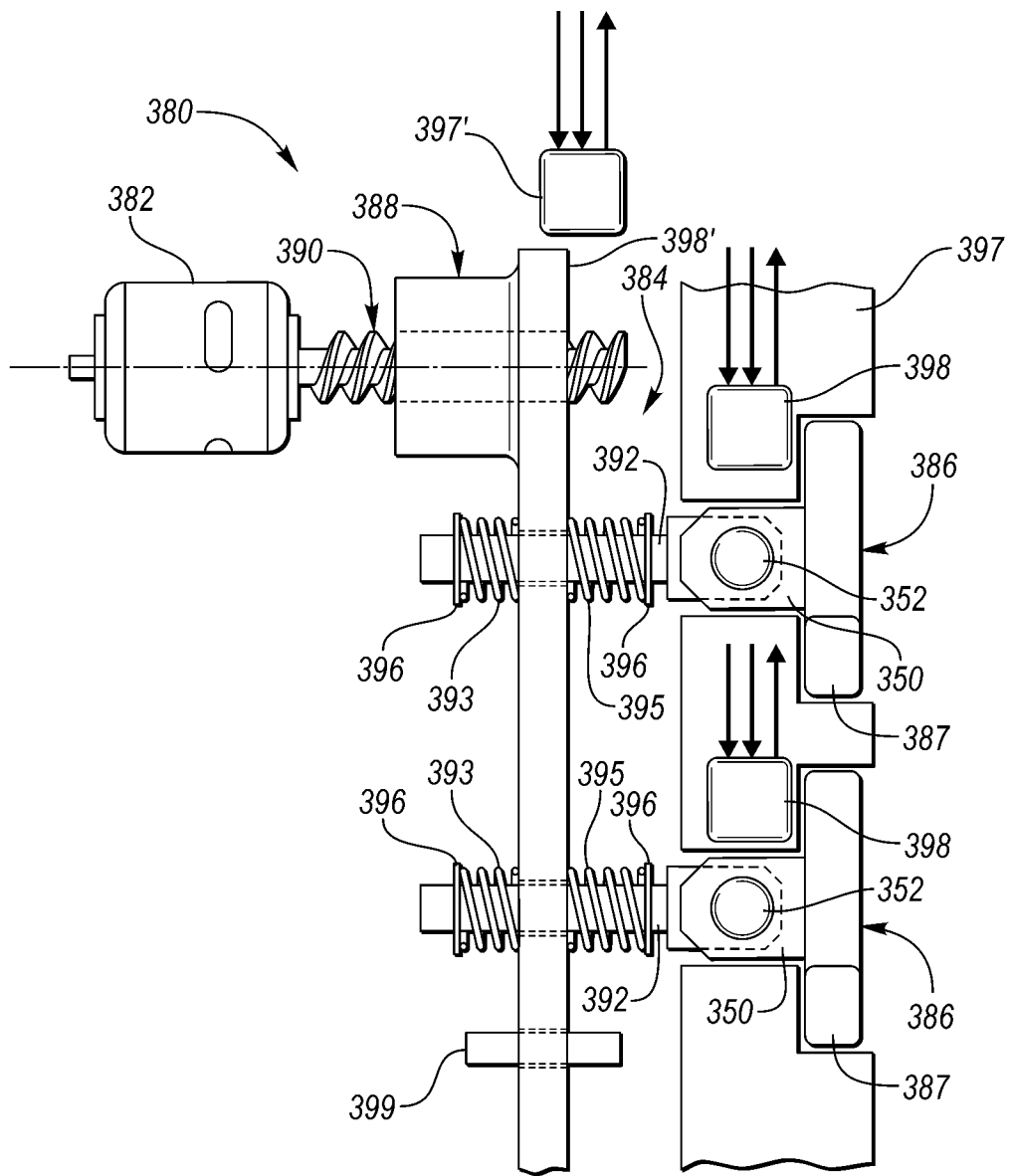
FIG. 5 is a view, similar to the view of FIG. 3, wherein multiple locking members supported on a common plate are actuated by a single actuator and wherein the locking members are shown in a static pocket plate or coupling member; an alternative sensing location is also shown.
Figure 6:
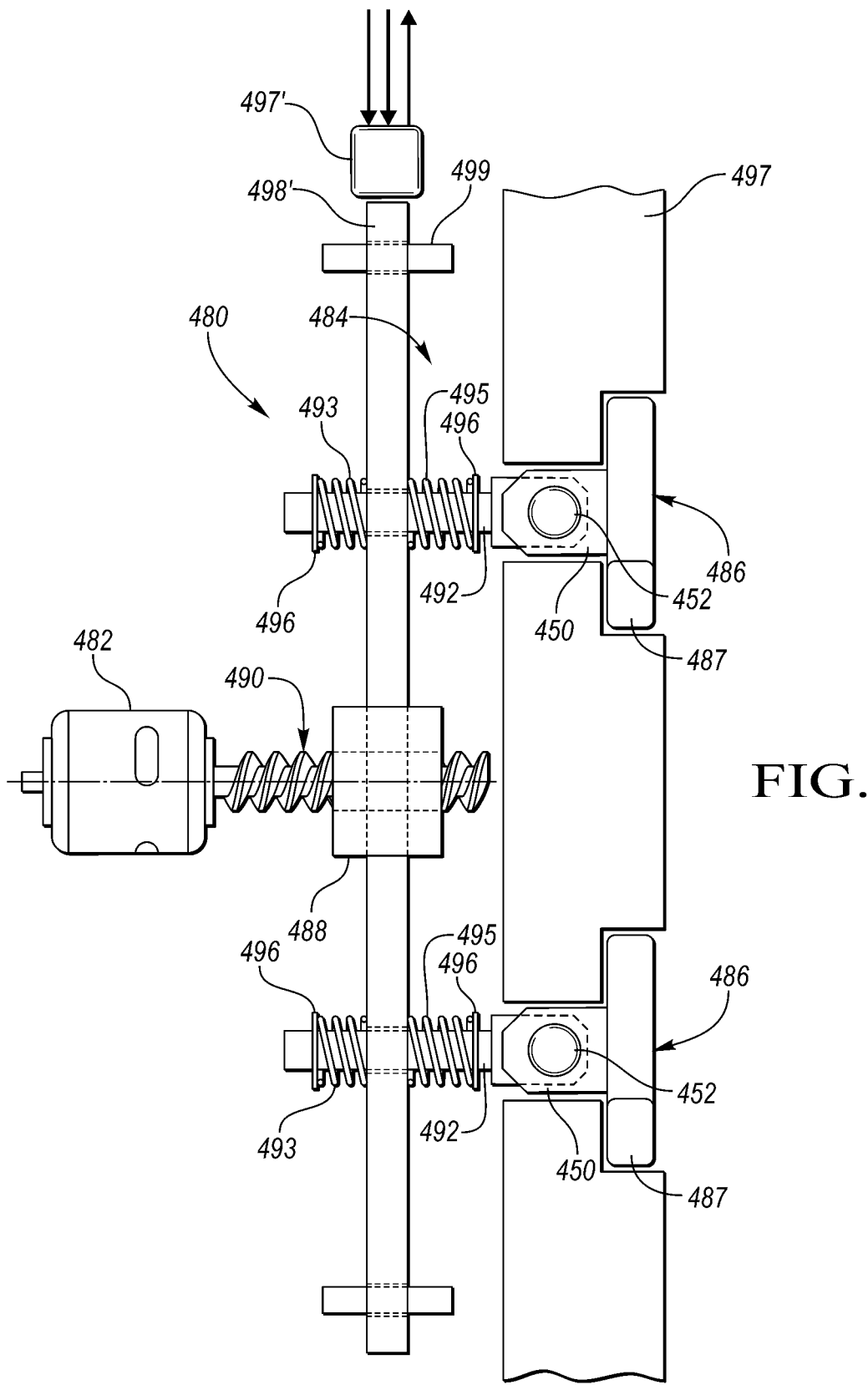
FIG. 6 is a view, similar to the view of FIG. 5, wherein the locking members are shown in a dynamic (i.e., rotating) pocket plate, an actuator/transmission plate that is non-back-drivable; it is possible direct to sense the strut position in a dynamic pocket plate but would require a costly slip ring to provide power and control signals to/from the sensors; this arrangement could be used in a static pocket plate design but has packaging disadvantages compared to the embodiment of FIG. 5.

Each of the apparatus or assemblies 80, 180, 280, 380 and 580 also preferably includes at least one non-contact position sensor 98, 198, 298, 398 and 598, respectively, supported on its corresponding pocket plate 97, 197, 297, 397 and 597, respectively, to provide a position feedback signal as a function of the position of its respective locking member 86, 186, 286, 386 and 586. Alternatively, as shown in FIGS. 5 and 6, a position sensor 397' or 497', respectively, senses position of an intermediate transmission element such as a plate 398' or 498', respectively, when a plurality of locking members are to be moved in unison.

Each sensor may include at least one magnetic or ferromagnetic magnet (not shown) mounted for movement with its respective strut and at least one, and preferably two, magnetic field sensing elements disposed adjacent with respect to the at least one magnet in its pocket plate for sensing magnetic flux to produce position feedback signals to a controller. Each magnetic field sensing element is preferably a Hall Effect sensor. Alternatively, the sensor may comprise an inductive position sensor. The two digital sensors can be replaced with a single analog sensor or by monitoring motor current by a current sensor.

Figure 9:
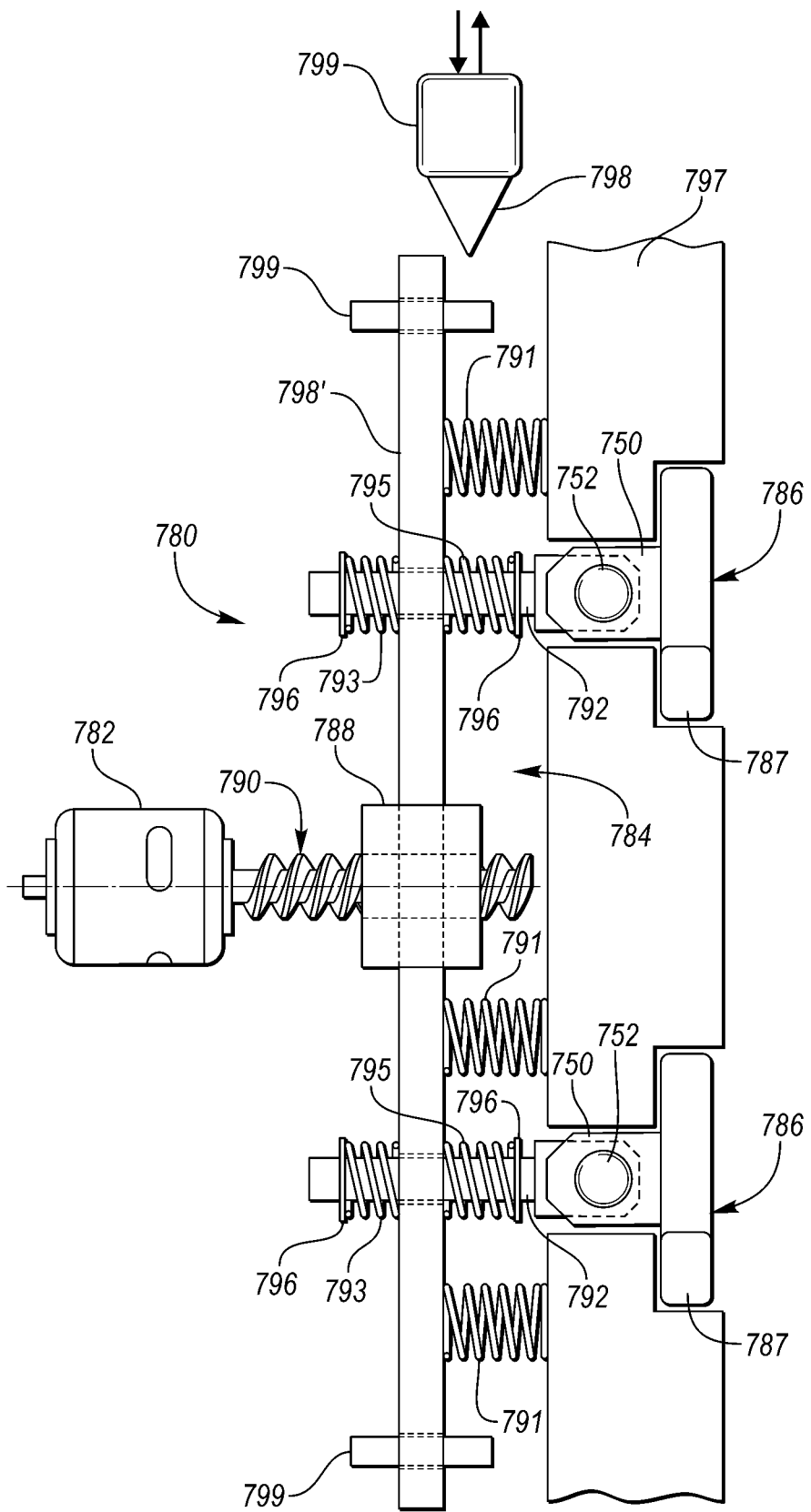
FIG. 9 is a view, similar to the view of FIG. 6, including a latching mechanism which locks the position of a back-drivable, failsafe actuator/transmission plate.

Since the nut 88 of FIG. 2 (as well as the nuts of FIGS. 3-7) is not back-drivable (thereby providing a latching function), no separate latching device (as shown in FIGS. 8-10) is typically needed.

Figure 3:
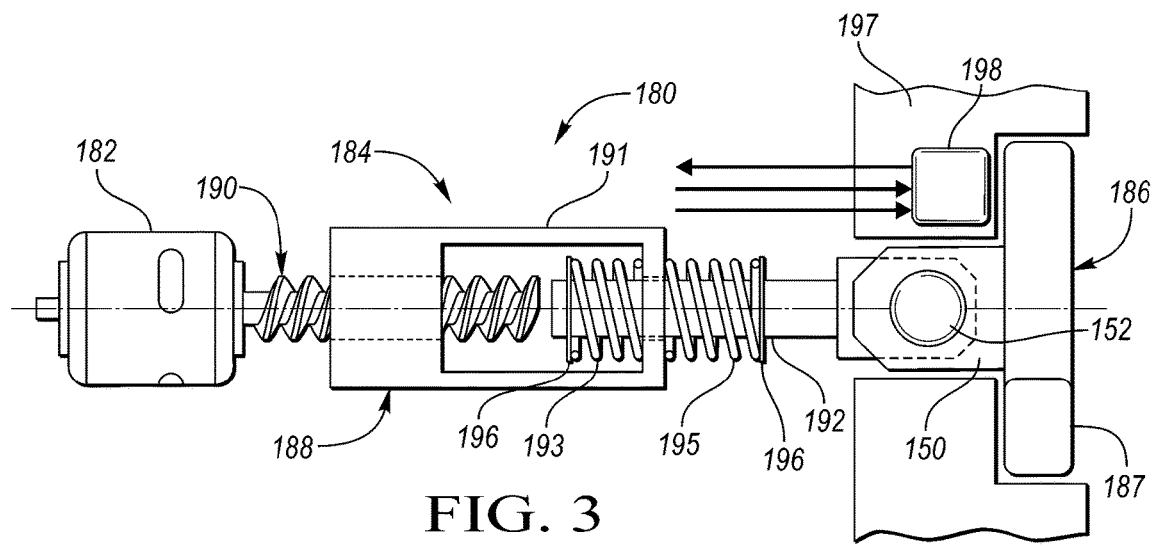
FIG. 3 is a view, similar to the view of FIG. 2, with the addition of a pair of biasing springs which provides a second embodiment of the apparatus with spring isolation for the actuator.
Figure 4:
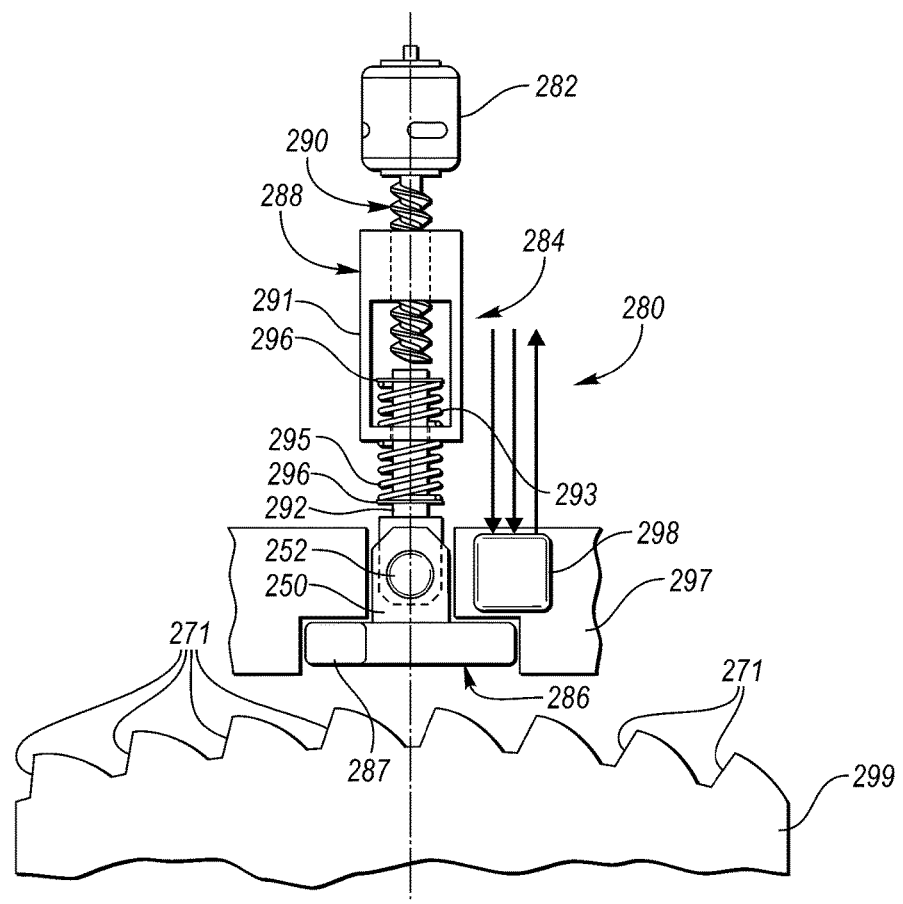
FIG. 4 is a view, similar to the view of FIG. 3, wherein the electromechanical apparatus is shown mounted on a transmission housing for engagement with the radial face of a toothed coupling member or plate.

In the embodiments of FIGS. 3 and 4 (and 9, 10 and 11), the screw's lead angle is increased so that the nuts 188 and 288 are back-drivable and sets of biasing springs 195, 193 and 295, 293 (and springs 791, 891 and 995 of FIGS. 9, 10 and 11), respectively, are added to return the nuts 188 and 288 to a safe clutch state or mode when their motors 182 and 282 are de-energized. In FIGS. 3, 4, 5, 6, 9 and 10 the springs spring-isolate their plungers from their actuators. That way if their struts are pushed up into the top of their notches, the systems will not bind. Each actuator is free to complete its travel and the biasing force on the sets of springs 195, 193 and 295, 293 will cause its strut to drop into its notch when its strut is no longer blocked by the top of the notch profile. These features:

add passive, mechanical, failsafe functionality;
    allow motor power to be renewed when the clutch is torque locked, allowing the locked struts 186 and 286 to partially return; thus, improving the response time of the clutch when returning to a safe state.

This is correct for the spring-isolation scheme of FIGS. 3, 4, 5, 6, 9, 10 and 11. However, when the strut is torque-blocked the strut is unable to move until the clutch is completely unloaded. The spring-isolation allows the controller to turn on the motor and move the actuator (the nut or screw) to the strut's disengaged position. The spring 193/293/393/493/793/893/995 will be compressed by the nut or actuator plate and will be exerting a force against the stop 196/296/396/496/796/896/996. Once the strut becomes unloaded the spring force against the stop will pull the plunger downward, drawing the strut back into its pocket.

Referring again to FIGS. 9, 10 and 11, the stored energy in the compressed return springs 791, 891 and 995 allow their systems to be mechanically failsafe, thus allowing their motors to operate in a single direction which allows cost savings in their driving circuitry.

In the embodiment of FIG. 8, a latching mechanism in the form of a latching solenoid 699 is provided substantially perpendicular to the screw shaft 690 and whose armature or plunger 698 extends between the threads of the shaft 690 to latch the screw shaft 690.

Preferably, the latching solenoid 699 is a push type and spring-returned by a spring 697 so that upon power loss, the armature 698 having an angled free end retracts to allow linear movement of the shaft 690. An advantage of the use of the solenoid 699 is reduced energy consumption (return solenoid 699 verses lead screw motor 682) and ability to prevent unintended actuation in either clutch state.

Similarly, referring to FIGS. 9 and 10, latch solenoids 799 and 899 have armatures/plungers 798 and 898, respectively, to lock the position of their respective actuator plates 798' and 898'.

Referring again to FIG. 1, at least one of the embodiments of the present invention could be utilized to actuate the teeter-totter strut 22. A lead screw nut could be coupled to a plunger that would be located within the spring-containing bore. The top of the plunger would be coupled to and act on the bottom of the spring 58 to, in turn, actuate the strut 22.

Referring again to FIG. 2, the embodiment disclosed therein has the following features:

Rigidly affixed, single unit;

As the DC motor 82 rotates or spins the lead screw 90, the nut 88 and the plunger 92 move linearly. The plunger 92 moves with the nut 88 via the coupler 91 and the strut 86 pivots between a pin 52 and arms 50 of the clevis strut 86 and about the ears 87 of the strut 86; the ear rails on the notch plate or a retainer plate similar to 47 in FIG. 1 hold the ears 87 down into the pocket, forcing the strut to pivot when the plunger 92 is moved upward or downward;

Increased tolerances between a free end of the plunger 92 and arms 50 of the clevis strut 86, as well as between the pin 52 and the free end of the plunger 92 allows the strut 86 to self-align when torque loaded while not imparting torque load into the nut and plunger assembly.

The sensing arrangement of FIG. 2 could be used for a stationary or dynamic pocket plate. Directly sensing strut position has advantages verses sensing the position of the actuator and indirectly inferring the position of the strut 86. A dynamic pocket plate would require a slip ring of some sort to receive power and a common and transmit the sensor output (i.e., 2 inputs and 1 output as shown in FIG. 2).

Referring to FIG. 3, the embodiment disclosed therein has the following features:

Similar to the embodiment of FIG. 2 in terms of lead screw operation but with biasing springs 193 and 195 on the plunger 192 (and held by retainer clips 196 against the coupler 191) are biased by motion of the nut 188 which then act upon the strut 186 similar to arrangement shown in U.S. Pat. No. 8,646,587.

If the strut's motion is prevented (blocked by a notch or torque-locked), the springs 193 and 195 can be biased and the strut 186 will move when it is unloaded/no longer blocked. Removes possibility of the nut 188 binding against the plunger 192 when strut motion is blocked.

For the spring-isolated actuator, it is important to directly sense the position of the strut 186 via the sensor 198 as the actuator only mechanically biases the springs 193 and 195 which in turn act on the plunger 192.

In the example of FIG. 3, the strut 186 may be engaged and torque locked, so it cannot be drawn back into its pocket within the pocket plate 197 by the actuator. For the spring-isolated actuator, if the position of the lead screw 190 was sensed rather than the strut 186, a motor controller would have no way of directly knowing (it is possible to indirectly determine by using input and output speed calculations) if the strut 186 is torque-locked. For engaging the clutch, if the strut's motion is blocked due to misalignment between the notch of a notch plate (not shown) and the strut 186, the strut 186 cannot carry a load until the notch plate rotates and the strut 186 can then drop into the next available notch. The sensor 198 directly adjacent the strut 186 can tell the motor controller that the strut 186 hasn't dropped into the notch and the controller can adjust the shift event timing and torque to help reduce windup and the resulting NVH.

In the example of FIG. 4, the following features are provided:

Has applicability to actuating its strut 286 to couple to a radial face of a coupling member 299; teeth 271 are provided on the radial face of the coupling member 299 for engagement by the strut 286; the apparatus 280 is supported by a transmission case 297 with either a semi-rigidly fixed or spring-isolated lead-screw actuator of FIGS. 2 and 3, respectively; also, extendable to other radial-engagement clutches such as solenoid-based radial clutches;

Single or multiple units (i.e. struts) in radial arrangement;

The plunger-to-screw connection can be either spring-isolated or semi-rigid;

A semi-rigid design allows possible disengagement under load.

Directly sensing the strut position allows the motor controller to detect actuator mechanical or electrical failure. This is especially important when there is only one or two actuated struts present in the clutch.

For a single strut per actuator, spring isolation is helpful when the strut's motion is blocked when the clutch is torque-locked or the strut and a notch are misaligned. If the strut and actuator were rigidly attached, the actuator with its high torque multiplication would be pushing directly against a strut that cannot move. This would expose the strut/actuator interface to high forces requiring significantly more material/cost to withstand these conditions. If the actuation is relative slow, the actuator can move while the strut's motion is still blocked or the clutch is overrunning in that direction (struts won't engage). Under this method when the struts become unblocked or a torque reversal occurs the struts are already in position to engage allowing for faster smoother engagements of the clutch.

Similar to single strut/actuator arrangements, spring-isolation is key for moving multiple struts via a single actuator. If the struts were rigidly attached to an actuator plate and if one strut's motion was blocked, the whole clutch would remain in its current state. This could result in the clutch failing to engage and the shift must be aborted or conversely the clutch takes significantly longer to disengage.

Referring to FIG. 5, the embodiment disclosed therein has the following features:

Similar to design of FIG. 3 but the lead screw 390 drives the nut 388 which, in turn, drives a plate 398' that acts on multiple plungers 392; this concept is for a static pocket plate 397;

The nut 388 is attached to the plate 398', guide pins (only one shown as 399) elsewhere on the plate 398' help prevent binding;

The plate 398' can be arc-shaped and could feasibly actuate the entire clutch's compliment of struts 386. For either planar or radial strut arrangements;

For failsafe operation, the clutch could have two actuator banks, spaced 180° apart.

With the static pocket plate 397, multiple struts 386 are actuated by single actuator. Spring isolation is key for moving multiple struts 386 via a single actuator. If the struts 386 were rigidly attached to the actuator plate 398' and one strut's motion was blocked, the whole clutch would remain in its current state.

It is important to directly sense strut position for the spring-isolated system of FIG. 5. However, if cost or packaging concerns exist, a single sensor as indicated at 397' could be mounted in the alternate location as shown to sense the position of the actuator plate 398'.

Referring to FIG. 6, the embodiment disclosed therein has the following features:

- Similar to the embodiment of FIG. 5, but modified to be used on a dynamic rotating pocket plate 497 (alternatively, the plate 497 could be a notch plate or a transmission case);
- The lead screw nut 488 preferably comprises two pieces bolted or fastened together to entrap the actuator plate 498';
- The plate 498', the struts 486, the plungers 492, and the guide pins 499 all rotate with the pocket plate 497.
- Dynamic (rotating) pocket plate 497, multiple struts 426 actuated by a single actuator.

As previously mentioned, directly sensing strut position for the spring-isolated system of FIG. 6 is important. The opportunity cost for sensors mounted on the rotating pocket plate 497 requires some sort of slip ring to obtain power and send the sensor data back to the motor controller. Slip rings, however, are costly, add rotational inertia and have additional mechanical failure modes.

As an alternative to direct strut sensing, a single sensor 497' can be mounted in the indicated, non-rotating location to sense the position of the actuator plate 498'; as previously mentioned, the clutch's state can be inferred from input and output speed sensors, which is the ultimate feedback on the clutch's state. The alternate sensor 497' and speed sensor feedback is enough to know clutch condition at all times.

Referring to FIG. 7, the embodiment disclosed therein has the following features:

- Rotating nut 588, translating (non-rotating) screw shaft 590;
- Offset motor 582 connected via gearing 591 to the rotating nut 588;
- Through-bushing 594 slidably supports one end of the lead screw 590;
- Simplified (i.e. integral) connection between the actuator lead screw 590 and the plunger 592;
- Can have either spring-isolated or semi-rigid connection between the plunger 592 and the screw;
- Static (non-rotating) pocket plate 597, single strut 586 actuated by single, rotating-nut actuator.

Referring now to FIG. 8, the embodiment shown therein has the following features:

- Similar mechanics to the embodiment of FIG. 7 but utilizes cam features (i.e. cams 695 and 696) on the output shaft 683 of the motor 682 and the nut 688 to rotate the nut 688, causing the screw 690 to translate within the through-bushing 694;
- Can replace the motor 682 with a solenoid or other linear actuator;
- Shows a solenoid 699 where power needs to be applied to allow screw motion; could also be implemented with a spring-return solenoid, so screw motion is only allowed when the solenoid 699 is de-energized;
- The angled end of the armature 698 drops between the threads on the lead screw 690 to trap and prevent linear screw motion.

Referring now to FIG. 9, the embodiment disclosed therein has the following features:

- The armature 798 has the classic triangle wedge shape which allows the plate 798' to return to its initial position after power is lost to the solenoid 799. The armature 798 only locks the plate 798' into the actuated (struts up) position;
- Latch solenoid 799 and its armature/plunger 798 locks the position of the actuator plate 798';
- Shallow lead-angle on the lead screw 790 makes it back-drivable by return springs 791;
- Return springs 791 are shown in their non-compressed condition;
- The dynamic pocket plate 797 and the multiple struts 786 are actuated by single actuator, the clutch is shown in its failsafe, struts "covered" positon; the return spring could be implemented in a static pocket plate (i.e. FIG. 5) as well;
- Latch solenoid (i.e. 799) design is based off other spring-returned, energize-to-extend, armature-type designs. The solenoid's return spring in this case causes the armature 798 to withdraw, allowing actuator plate 798' to move. Depending on design features on the actuator plate 798' and the solenoid armature end shape, one solenoid 799 can latch the clutch into either state; when the solenoid is de-energized to retract, this enables the mechanical failsafe function.

Figures 10A, 10B:
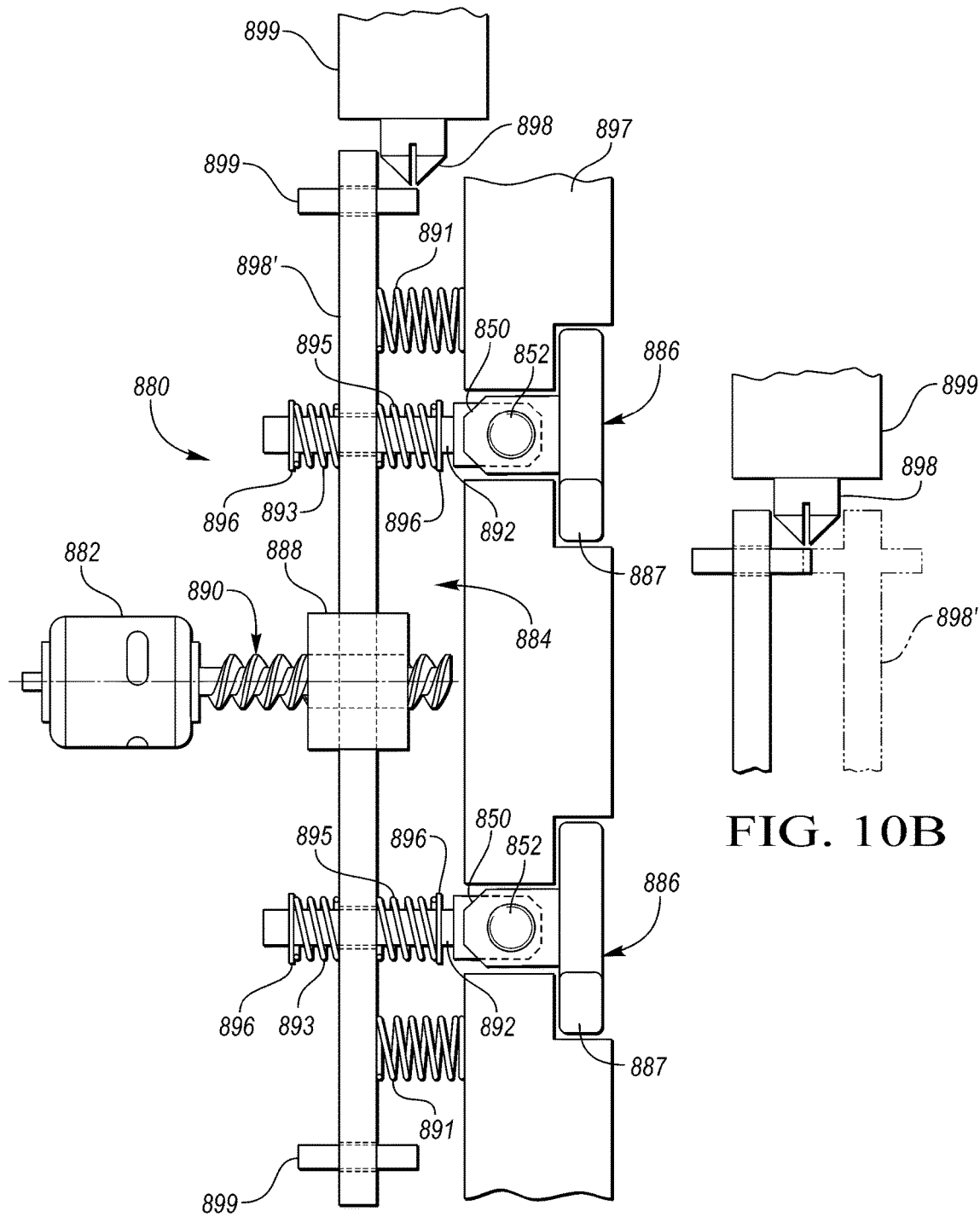
FIG. 10A is a view, similar to the view of FIG. 9, showing the details of an example solenoid armature end of a latching solenoid.
FIG. 10B is an enlarged view of a portion of the view of FIG. 10A to illustrate the interaction between the armature and the plate.

Referring now to FIGS. 10A and 10B, the embodiment disclosed therein has the following features:

- Latch solenoid armature/plunger 898 locks or traps the position of the actuator plate 898' in either its energized (extended) position or its de-energized (retracted) position;
- Solenoid plunger geometry and location such that the plunger 898 can lock a clutch into either state. When disengaged, prevents inadvertent actuation; when engaged, allows the DC motor 882 to be turned off while the clutch remains engaged;
- Return springs 891 are shown in their non-compressed condition;
- FIG. 10B shows the solenoid 899 energized (i.e. extended); upon power loss, the armature/plunger 898 retracts, clearing the plate 898;
- The rightmost, phantom lines of FIG. 10B show the actuator plate 898' in one of its two positions; the solenoid is energized and the armature 898 is capable of trapping the actuator plate 898' in either of the two positions; when the solenoid is de-energized, the springs 891 will urge the plate 898' back into the "safe" condition shown by the solid lines; trapping the actuator in the covered (left-most) state under normal (non-failsafe) conditions is important as it guards against inadvertent actuation; the armature 898 has a two-cavity shape to trap the actuator plate 898' in either position; this is advantageous as fluid or dynamic forces on the plate 898' can result in inadvertent actuation of the plate 898' and, therefore, the struts 886.

Referring to FIG. 11, the embodiment disclosed therein has the following features:

- Retainer clip 996 on a plunger 992 for a return spring 995;
- a ball feature (i.e. 985) on the end of the plunger 992 to improve contact with a cam 991; and the cam 991 driven by a DC motor 982 via its output shaft 983. The pocket plate 997 is a two-piece pocket plate;
- mechanical failsafe if motor is de-energized;
- motor can be turned off while strut is still torque-locked allowing faster system response during disengagement maneuvers;

motor is only required to rotate in one direction (counter clock-wise in the figure), simplifying the motor's control circuitry;

could be achieved with a single piece pocket plate design.

Figure 12:
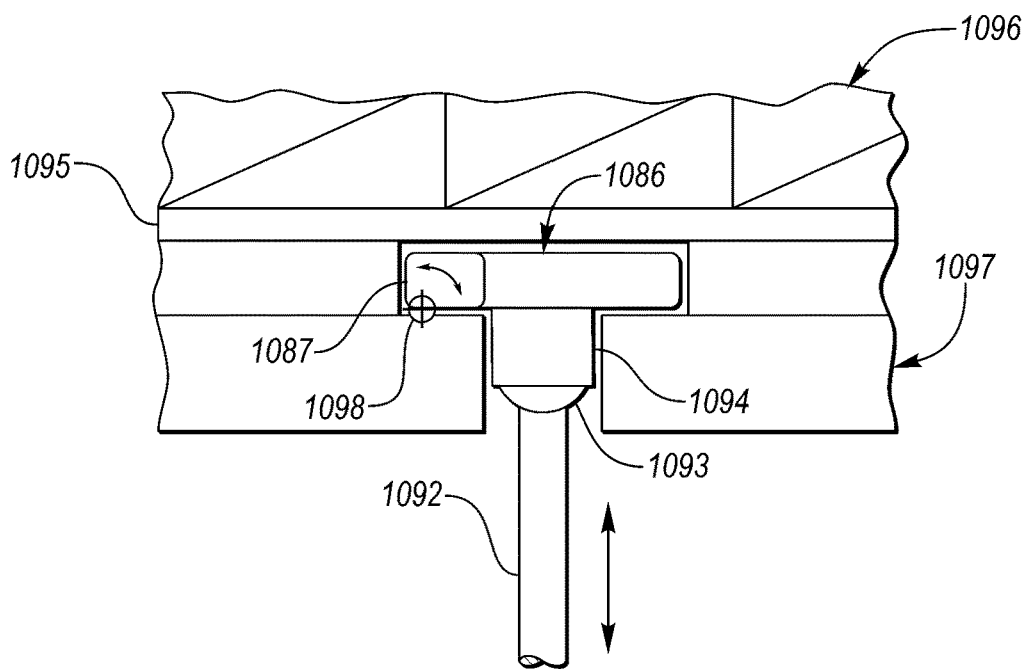
FIG. 12 is a view, partially broken away, of a ball-and-socket joint or interface between a plunger and a strut.

Referring to FIG. 12, the embodiment disclosed therein has the following features:

The plunger 1092 moves up the semi-rigid connection between a ball 1093 formed on a free end of the plunger 1092 and a socket 1094 formed on the bottom side of the strut 1086, which forces the strut 1086 up from its pocket in a two-piece pocket plate 1097. Rails 1095 on a notch plate 1096 prevent the strut's ears 1087 from rising as well forcing the strut 1086 to pivot about its ears 1087. The non-rigid nature of the ball-socket connection or joint allows pivoting between the ball 1093 and the socket 1094 and about the axis 1098 of strut rotation.

The ball-and-socket arrangement could be used in any of the radial or planar configurations for a dynamic or static clutch including where an apply plate controls multiple struts. Latching or non-latching schemes are possible. It is possible, given a strong enough socket and ball/plunger, that the strut 1086 could be disengaged under load. However, this arrangement does not protect the strut 1086 against being loaded against into the top of the notch plate 1096 when a notch and the strut 1086 are misaligned, (i.e., the strut 1086 is not in the correct position to drop into a notch as it moves upward). There are two advantages here. First, one may be able to get higher disengagement forces compared to the clevis strut. Second, compared to the teeter-totter strut, one can remove a return spring in each pocket, as the strut 1086 is captive or is directly connected to the plunger 1092.

As disclosed herein there are many possible interfaces that can be employed between the actuator and the strut. In the single strut arrangement, the strut can be actuated via a variety of arrangements. Three such ways are disclosed herein:

i. Clevis arrangement;
ii. "Teeter-Totter" strut;
1. Multiple teeter-totter struts could be controlled by a single axial actuator or be adapted to move plungers or plunger pins for the teeter-totter struts, allowing multiple sets of struts to be manipulated by a single actuator.
iii. Ball-and-socket method of mechanically interfacing the strut and actuator plunger.

As disclosed herein, under some operating conditions within the transmission it is very difficult or impossible due to the power flow for the clutch to experience a full torque reverse, i.e. become completely unloaded. Thus it is desirable for clutches to be able to disengage under load, to ensure the clutch can always disengage with the after effect of faster shift events. Friction packs are capable of disengaging under load, when hydraulic pressure is removed from the apply piston the friction packs begin to slip. As OEMs move to SOWCs in the pursuit of decreased transmission spin loss for improved fuel economy, leveraging control strategies and power flows that were developed with friction packs as the clutch elements is key for risk mitigation.

Traditionally, selectable one-way clutches (SOWCs) have had limited ability to disengage when the clutch is torque loaded. The forces on the strut generated by the clutch's load torque far exceeded the forces the actuator could deliver to disengage the strut. The proposed lead screw-based actuation system has the potential to deliver significantly higher forces to the strut, opening the possibility of disengaging the strut under load. Basically the increased available actuator force, coupled with the actuator's ability to semi-rigidly directly act on the strut enable disengagement under load. The actuator will either pull or push on the strut, depending on configuration causing it to come out of the notch. Once the connection between the notch, strut and pocket has been opened, the clutch is now able to freewheel in the direction it was previously torque locked.

Solenoid-based electromechanical actuators have difficulty in generating high actuation force over large displacements while still consuming acceptable amounts of power. The lead screw concept disclosed herein using a controlled DC motor does not suffer from the decreasing force over increasing displacement. In addition for disengagement under torque, implementing motor current control allows better control over the actuator's position and speed. The total energy consumed for a shift event may be the same but instantaneous power consumption is important to OEMs.

This can be mitigated by implementing a complicated, energy storing controller to operate the clutch. The lead screw concept could forego a more complicated controller. With the addition of a solenoid to pin the lead screw nut into position, increasing the lead angle of the nut and putting a return spring between the actuator plate and the pocket plate the lead screw concept can be made into a mechanically, passively failsafe device. A linear motor device can do this too by decreasing the magnet size and adding a return spring to make the clutch non-latching. However, passive failsafe functionality will come with a higher power hit as this design will need to be constantly supplying power to the linear motor's coil, to keep it in the actuated state. The lead screw design would be constantly supplying power to a significantly smaller latch solenoid. If the lead screw/nut are back-drivable and it is acceptable to provide power to the motor continuously, the latching solenoid is not required to latch the system. The motor would be supplying significantly less power than the spring-returned linear motor in order to remain in position.

Brakes and clutches can be implemented using any of the three mechanisms for connecting the strut to the actuator: clevis, teeter-totter or ball joint.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromechanical apparatus for use with a controllable coupling assembly, the apparatus comprising:
   a locking member pivotable between an uncoupling position and a coupling position characterized by abutting engagement with a load-bearing shoulder of the coupling assembly; and
   a bi-directional, electrically-powered, actuator and transmission assembly including a rotary output shaft and a set of interconnected transmission elements including an input transmission element coupled to the output shaft to rotate therewith and an output transmission element which translates upon rotation of the output shaft to actuate the locking member and cause the locking member to pivot between the coupling and uncoupling positions which correspond to different operating modes of the coupling assembly.

2. The apparatus as claimed in claim 1, wherein the set of transmission elements include a threaded screw shaft and a nut threaded onto the screw shaft.

3. The apparatus as claimed in claim 2, wherein the input transmission element comprises the screw shaft and wherein rotation of the screw shaft causes the nut to translate.

4. The apparatus as claimed in claim 3, wherein the output transmission element comprises a plunger coupled to the nut to translate therewith.

5. The apparatus as claimed in claim 4, wherein the actuator and transmission assembly further comprises a biasing member to urge the plunger to a retracted position which corresponds to the uncoupling position of the locking member.

6. The apparatus as claimed in claim 5, wherein the actuator and transmission assembly further comprises a biasing member to urge the plunger to an extended position which corresponds to the coupling position of the locking member.

7. The apparatus as claimed in claim 3, wherein the nut is non-back-drivable on the screw shaft.

8. The apparatus as claimed in claim 3, wherein the apparatus has a plurality of locking members and a corresponding plurality of output transmission elements and wherein the set of transmission elements include a common, intermediate transmission element coupled to the nut to translate therewith and coupled to the output transmission elements so that the output transmission elements move in unison to actuate the plurality of locking members.

9. The apparatus as claimed in claim 8, wherein the intermediate transmission element comprises a plate on which the plurality of output transmission elements are supported.

10. The apparatus as claimed in claim 2, wherein the input transmission element is coupled to the nut to rotate the nut and cause the screw shaft to translate and wherein a free end of the screw shaft actuates the locking member.

11. The apparatus as claimed in claim 10, wherein the input transmission element includes a first cam and the set of transmission elements includes a second cam coupled to the nut to rotate therewith and ride on the first cam so that the nut rotates upon rotation of the output shaft.

12. The apparatus as claimed in claim 1, wherein the locking member is a strut.

13. The apparatus as claimed in claim 12, wherein the strut is a clevis strut and wherein the output transmission element has a free end pivotally connected to the clevis strut.

14. The apparatus as claimed in claim 12, wherein the strut has a socket and wherein the output transmission element has a ball formed at a free end thereof for insertion into the socket to form a ball-and-socket joint.

15. The apparatus as claimed in claim 12, wherein the strut is a teeter-totter strut.

16. The apparatus as claimed in claim 1, wherein the actuator and transmission assembly includes a DC motor having the output shaft.

17. The apparatus as claimed in claim 1, further comprising at least one non-contact position sensor to provide a position feedback signal as a function of the position of one of the transmission elements or the locking member.

18. The apparatus as claimed in claim 17, wherein each sensor includes at least one magnetic or ferromagnetic magnet and at least one magnetic field sensing element disposed adjacent and stationary with respect to the at least one magnet for sensing magnetic flux to produce the position feedback signal.

19. The apparatus as claimed in claim 18, wherein each magnetic field sensing element is a Hall effect sensor.

20. The apparatus as claimed in claim 1, further comprising a latching mechanism to hold one of the set of transmission elements in position.

21. The apparatus as claimed in claim 20, wherein the latching mechanism includes a latching solenoid.

22. The apparatus as claimed in claim 1, wherein the input transmission element comprises a cam and the output transmission element comprises a plunger having one end which rides on the cam to cause the plunger to translate upon rotation of the output shaft.

23. A coupling and electromechanical control assembly comprising:
 a coupling subassembly including first and second coupling members, the first coupling member being supported for rotation relative to the second coupling member about an axis, the first coupling member having a first coupling face with a plurality of recesses, each of the recesses defining a load-bearing shoulder;
 a locking member pivotable between an uncoupling position and a coupling position characterized by abutting engagement with a load-bearing shoulder of the first coupling member; and
 a bi-directional, electrically-powered, actuator and transmission subassembly including a rotary output shaft and a set of interconnected transmission elements including an input transmission element coupled to the output shaft to rotate therewith and an output transmission element which translates upon rotation of the output shaft to actuate the locking member and cause the locking member to pivot between the coupling and uncoupling positions which correspond to different operating modes of the coupling assembly.

24. The assembly as claimed in claim 23, wherein the set of transmission elements includes a threaded screw shaft and a nut threaded onto the screw shaft.

25. The assembly as claimed in claim 24, wherein the input transmission element comprises the screw shaft and wherein rotation of the screw shaft causes the nut to translate.

26. The assembly as claimed in claim 25 wherein the output transmission element comprises a plunger coupled to the nut to translate therewith.

27. The assembly as claimed in claim 26, wherein the actuator and transmission subassembly further comprises a biasing member to urge the plunger to a retracted position which corresponds to the uncoupling position of the locking member.

28. The assembly as claimed in claim 27, wherein the actuator and transmission subassembly further comprises a biasing member to urge the plunger to an extended position which corresponds to the coupling position of the locking member.

29. The assembly as claimed in claim 25, wherein the nut is non-back-drivable on the screw shaft.

30. The assembly as claimed in claim 25, wherein the assembly has a plurality of locking members and a corresponding plurality of output transmission elements and wherein the set of transmission elements includes a common, intermediate transmission element coupled to the nut to translate therewith and coupled to the output transmission elements so that the output transmission elements move in unison to actuate the plurality of locking members.

31. The assembly as claimed in claim 30, wherein the intermediate transmission element comprises a plate on which the plurality of output transmission elements are supported.

32. The assembly as claimed in claim 24, wherein the input transmission element is coupled to the nut to rotate the nut and cause the screw shaft to translate and wherein a free end of the screw shaft actuates the locking member.

33. The assembly as claimed in claim 32, wherein the input transmission element includes a first cam and the set of transmission elements includes a second cam coupled to the nut to rotate therewith and ride on the first cam so that the nut rotates upon rotation of the output shaft.

34. The assembly as claimed in claim 23, wherein the locking member is a strut.

35. The assembly as claimed in claim 34, wherein the strut is a clevis strut and wherein the output transmission element has a free end pivotally connected to the clevis strut.

36. The assembly as claimed in claim 34, wherein the strut has a socket and wherein the output transmission element has a ball formed at a free end thereof for insertion into the socket to form a ball-and-socket joint.

37. The assembly as claimed in claim 34, wherein the strut is a teeter-totter strut.

38. The assembly as claimed in claim 23, wherein the actuator and transmission subassembly includes a DC motor having the output shaft.

39. The assembly as claimed in claim 23, further comprising at least one non-contact position sensor to provide a position feedback signal as a function of the position of one of the transmission elements or the locking member.

40. The assembly as claimed in claim 39, wherein each sensor includes at least one magnetic or ferromagnetic magnet and at least one magnetic field sensing element disposed adjacent and stationary with respect to the at least one magnet for sensing magnetic flux to produce the position feedback signal.

41. The assembly as claimed in claim 40, wherein each magnetic field sensing element is a Hall effect sensor.

42. The assembly as claimed in claim 23, further comprising a latching mechanism to hold one of the set of transmission elements in position.

43. The assembly as claimed in claim 42, wherein the latching mechanism includes a latching solenoid.

44. The apparatus as claimed in claim 23, wherein the input transmission element comprises a cam and the output transmission element comprises a plunger having one end which rides on the cam to cause the plunger to translate upon rotation of the output shaft.

45. The assembly as claimed in claim 23, wherein the first coupling face is oriented to face axially with respect to the axis.

46. The assembly as claimed in claim 23, wherein the first coupling face is oriented to face radially with respect to the axis.

* * * * *